(12) United States Patent
Albers

(10) Patent No.: US 6,411,996 B1
(45) Date of Patent: *Jun. 25, 2002

(54) METHOD AND APPARATUS MAINTAINING A TO-BE-VISITED SITE BOOKMARK FILE

(75) Inventor: Michael C. Albers, San Francisco, CA (US)

(73) Assignee: Sun Microsystems, Inc., Mountain View, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/884,693

(22) Filed: Jun. 30, 1997

(51) Int. Cl.[7] .................. G06F 15/173; G06F 15/00
(52) U.S. Cl. ............... 709/223; 709/217; 707/516; 707/10; 707/1
(58) Field of Search .................. 709/206, 218, 709/220–223, 227–228, 326, 187.01, 685; 400/511.2, 670.1; 701/104, 10, 1; 707/516

(56) References Cited

U.S. PATENT DOCUMENTS

| | | | | |
|---|---|---|---|---|
| 5,761,436 A | * | 6/1998 | Nielsen | 395/200.75 |
| 5,813,007 A | * | 9/1998 | Nielson | 707/10 |
| 5,855,020 A | * | 12/1998 | Kirsch | 707/10 |
| 5,867,661 A | * | 2/1999 | Bittinger et al. | 709/227 |
| 5,890,164 A | * | 3/1999 | Nielsen | 707/201 |
| 5,890,172 A | * | 3/1999 | Borman et al. | 707/501 |
| 5,925,106 A | * | 7/1999 | Nielsen | 709/247 |
| 5,960,432 A | * | 9/1999 | Werner | 707/10 |
| 6,049,812 A | * | 4/2000 | Bertram et al. | 707/516 |

OTHER PUBLICATIONS

Info–Plaza a Social Information Filtering System for World–Wide Web, Hiraiwa, S.; Kohda, Y. Inst. for Social Inf., Fujitsu Labs. Ltd., Chiba, Japan, Parallel and Distributed Systems, Proceedings 1996, pp. 10–15, Jun. 3–6, 1996, ISBN:0–8186–7267–6.*

Efficient Caching of Temporary Files, Valdes, I; Paris J., Dept. of Comp. Sci., Houston Univ., TX, Parallel and Distributed Systems, Proceedings 1990, pp. 681–684, Dec. 9–13, 1990, ISBN:0–8186–2087–0.*

Glenn Krasner, "The Smalltalk–80 Virtual Machine", BYTE Publications Inc., Aug. 1991, pp. 300–320.

"Universal Serial Bus Specification", Revision 1.0, Jun. 15, 1996, pp. 1–268.

* cited by examiner

Primary Examiner—Mehmet B. Geckil
Assistant Examiner—Beatriz Prieto
(74) Attorney, Agent, or Firm—Blakely Sokoloff Taylor & Zafman

(57) ABSTRACT

A method and apparatus for creating and utilizing To-Be-Visited sites in a web enabled application accessible list is provided. The apparatus includes an access unit for adding the TBV site to the web enabled application accessible list, and a dating/deleting unit for determining whether the TBV site is expired, and deleting the TBV site if the TBV site has expired.

27 Claims, 8 Drawing Sheets

| 510 ~ | Site Title | Site Address | ~ 520 |
| --- | --- | --- | --- |
| 530 ~ | Date Site Was Added | Site Visited/Not Visited | ~ 540 |
| 550 ~ | Identifier of Electronic Message Referencing Site | | |
| 560 ~ | Icon for Linked Message Indicating Message Type | | |

FIG. 5

METHOD AND APPARATUS MAINTAINING A TO-BE-VISITED SITE BOOKMARK FILE

FIELD OF THE INVENTION

The present invention relates to computer network applications, and more specifically, to Internet enabled applications.

BACKGROUND OF THE INVENTION

The World Wide Web (web, www), a portion of the Internet which uses particular protocol, is an ever expanding information source which is used in work and play. The Web is accessed through a web enabled application. Web enabled applications include web browsers such as Internet Explorer and Navigator by Netscape, Corel Office for Java by Corel, Hotfava™ by Sun™, etc. and application programs such as Access and, Kona and Domino by Lotus, etc. For the user's convenience, a today's web enabled application may include a Favorites or Bookmarks list. This list is provided by the web enabled application, and is modified by the user. Generally, the user selects a site and directs the web enabled application to go to that site. This involves downloading the site web pages which may be a very time consuming operation. When the user is at the selected site, he or she may select the bookmark or favorite menu item from the web enabled application, and add the current site to the bookmark file. The site then remains in the user's bookmark or favorites list until the user deletes the site.

However, web enabled applications do not allow a user to automatically add a site to the Bookmarks or Favorites list without first \* Sun, Sun Microsystems, the Sun logo, Java, and HotJava are registered trademarks of Sun Microsystems Inc. in the United States, and other countries. visiting the site (i.e. downloading site web pages). This means that if the site is not available, the user can only add the site to the Bookmark or Favorites list by typing in the name and resource locator (RL) of the site. This is disadvantageous, because it requires the user to retype an address which is already available.

Additionally, the bookmarks can only be added within the web enabled application. Thus, when a user receives an e-mail which includes an RL, he or she can not add the RL included in the e-mail to the Bookmarks list, without retyping it or visiting it.

Furthermore, the Bookmark list is permanent. Bookmarks remain in the Bookmark file until the user deletes them. In some instances, a user merely wishes to retain a To-Be-Visited site's address temporarily.

BRIEF SUMMARY OF THE INVENTION

The present invention includes a method and apparatus for including a To-Be-Visited (TBV) list in a web enabled application. A TBV list contains TBV sites, which are sites a user wishes to access at a future time. The apparatus includes an access unit for adding a TBV site to the TBV list. The TBV list is accessible to a plurality of web enabled applications. The apparatus further may include a dating/deleting unit for determining whether the TBV site is expired, and deleting the TBV site if it is expired. The apparatus further may include a resource locator recognition unit, which automatically adds a TBV site received in an electronic message to the TBV list.

BRIEF DESCRIPTION OF THE DRAWINGS

The present invention is illustrated by way of example, and not by way of limitation, in the figures of the accompanying drawings and in which like reference numerals refer to similar elements and in which:

FIG. 5 is a block diagram illustrating the elements of a To-Be-Visited site in a web enabled application.

DETAILED DESCRIPTION OF THE PREFERRED EMBODIMENT

A method and apparatus for including To-Be-Visited (TBV) sites in a web enabled application is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Figure 1:
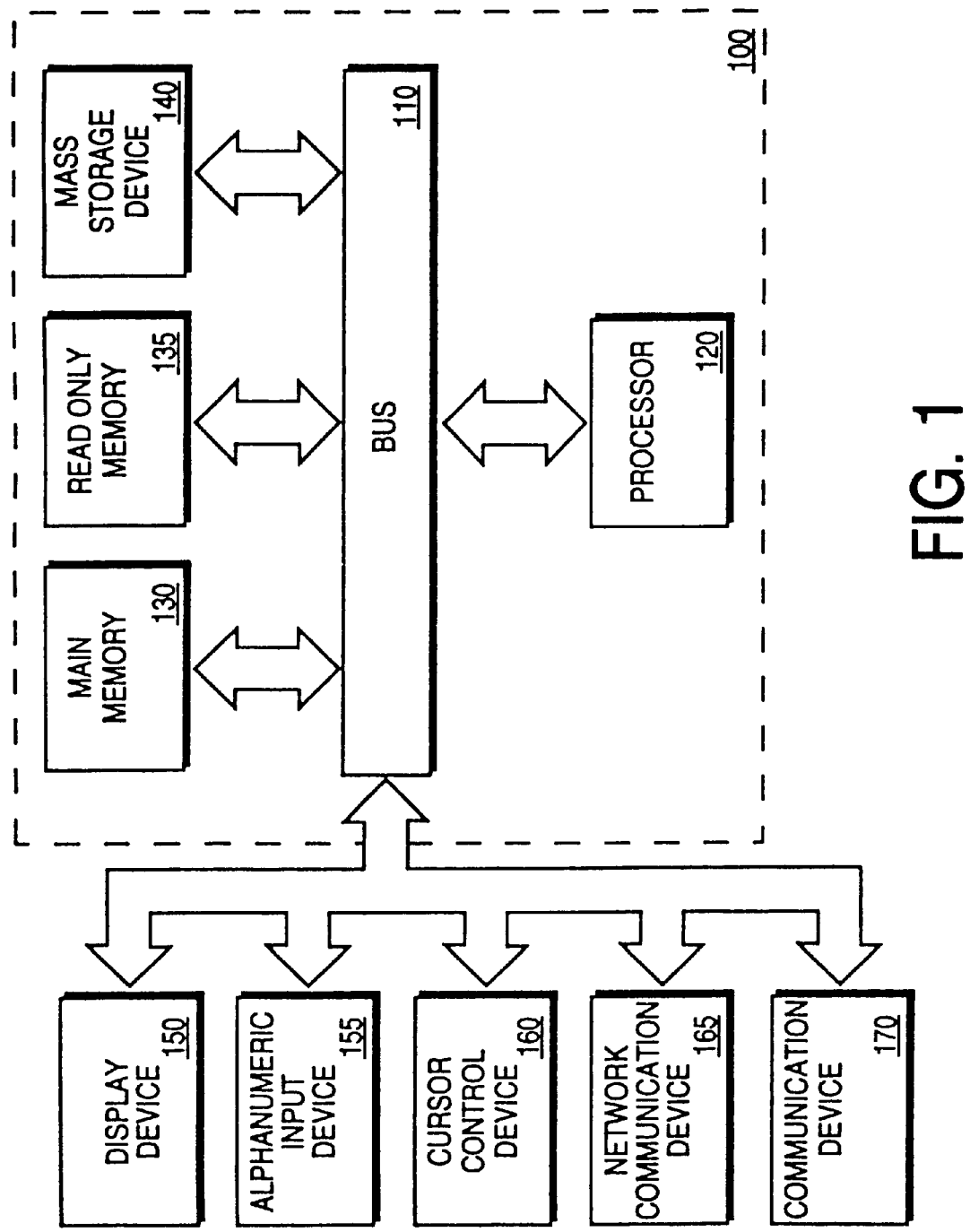
FIG. 1 is a block diagram of a computer system in which one embodiment of the present invention is implemented.

FIG. 1 is a block diagram of the computer system 100 in which an embodiment of the present invention can be implemented. Computer system 100 comprises a bus 110 or other communication means for communicating information, and a processor 120 coupled with bus 110 for processing information. Computer system 100 also comprises a read only memory (ROM) and/or other static storage device 135 coupled to bus 110 for storing static information and instructions for processor 120.

The computer system 100 further comprises a main memory 130, a dynamic storage device for storing information and instructions to be executed. Main memory 130 also may be used for storing temporary variables or other intermediate information during execution of instructions. In one embodiment the main memory 130 is dynamic random access memory (DRAM).

Computer system 100 can also be coupled via bus 110 to a display device 150, such as a cathode ray tube (CRT) or liquid crystal display (LCD) screen, for displaying information to a computer user. An alphanumeric input device 155 is typically coupled to bus 110 for communicating information and command selections to processor 120. Another type of user input device is cursor control device 160, such as a mouse, a trackball, trackpad, or cursor direction keys for communicating direction information and command selections to processor 120 and for controlling cursor movement on display device 150. Alternatively, other input devices such as a stylus or pen can be used to interact with the display. The computer system 100 may further be coupled via the bus 110 to a network communication device 165. The network communication device 165 may be utilized to couple the computer system to other computer systems, as well as the World Wide Web (web, www). The computer system 100 may further be coupled via the bus 110 to a communication device 170. The communication device 170 may be a speaker or microphone, or other device to communicate between a user and a computer system 100.

The present invention is related to a web enabled application in a computer system 100. According to one embodiment, a To-Be-Visited (TBV) site list is managed by computer system 100 in response to the processor 120 executing sequences of instructions contained in memory 130. Execution of the sequences of instructions causes the computer system 100 to add TBV sites, delete TBV sites, and visit TBV sites as will be described hereafter. For one embodiment, the software may be implemented on a computer readable medium, such as a hard disk, CDROM, floppy disk, or other media. For another embodiment, the software may be transmitted over a network as a computer data signal embodied in a carrier wave. In alternative embodiments, circuit logic internal to the computer system 100 may be used in place of or in combination with software to implement the present invention. Thus, the present invention is not limited to any specific combination of hardware and software.

Figure 2:
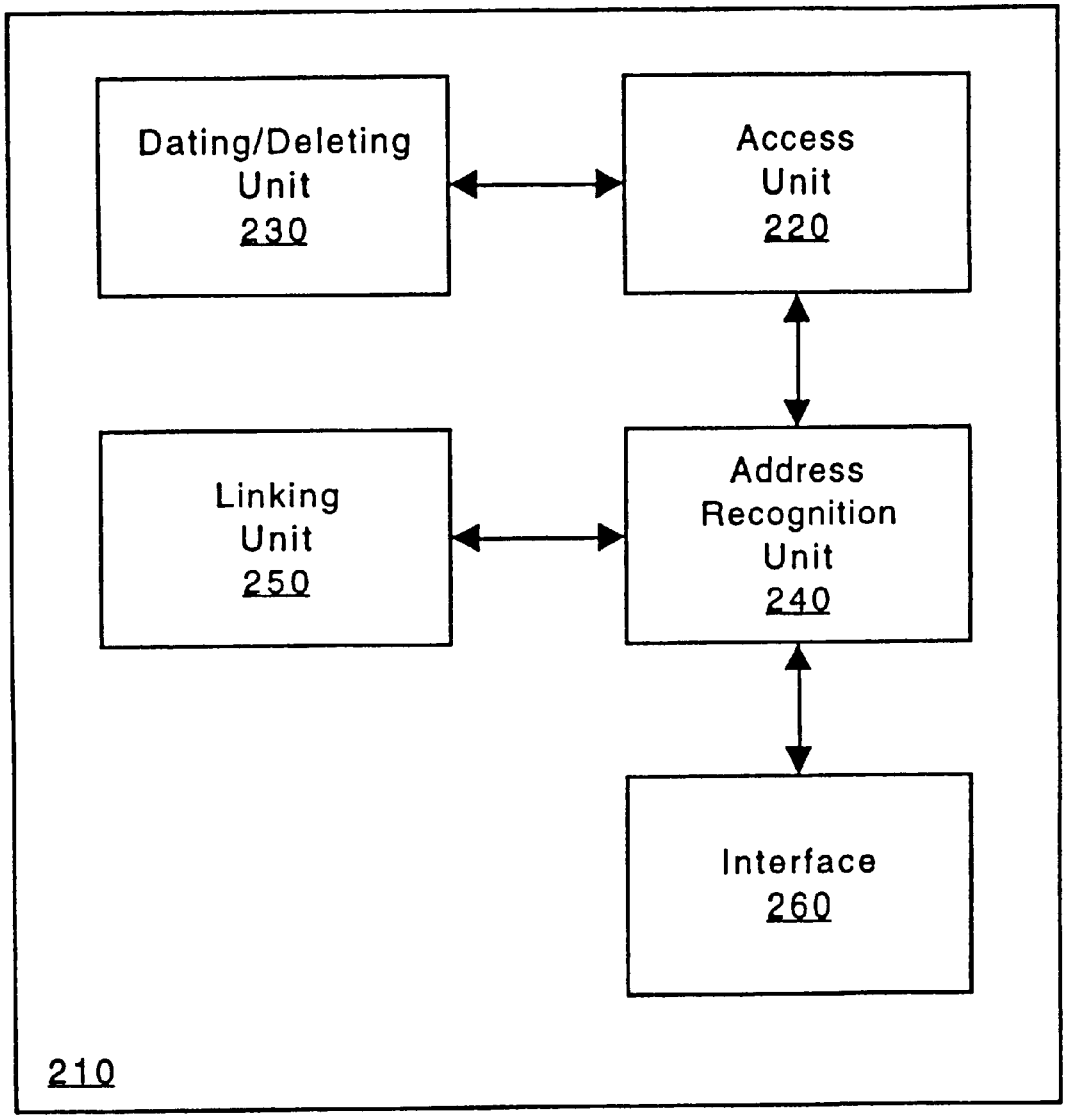
FIG. 2 is a block diagram of one embodiment of the present invention.

FIG. 2 is a block diagram of one embodiment of the present invention. The TBV unit 210 is designed to allow To-Be-Visited (TBV) sites to be stored in a computer system and accessible through a web enabled application, such as a browser or application program. Such TBV sites are sites which the user may or may not have visited in the past.

The TBV sites may be added inside or outside the web enabled application, as will be described below. The TBV unit 210 includes an access unit 220 which accesses the web enabled application, or a file associated with a web enabled application, and adds To-Be-Visited (TBV) sites. In one embodiment, the TBV sites are stored in a separate TBV file. In an alternate embodiment, the TBV sites are in a special TBV folder within a Bookmark file of the web enabled application. Alternately, the TBV sites may be stored in a Bookmark file which is accessible by a plurality of web enabled applications. The access unit 220 may add the TBV site either by accessing a web enabled application and adding the file through the web enabled application menu, or alternately, by accessing a Bookmark or TBV file directly, without starting the web enabled application.

The TBV sites may be available and displayed by a plurality of web enabled applications. In one embodiment, the TBV sites are displayed in all web enabled applications which are capable of displaying Bookmark or TBV files. Thus, the TBV list acts as a universal file list. Alternatively, a user may determine in what applications TBV sites should be displayed.

A dating/deleting unit 230 is coupled to the access unit 220. The dating/deleting unit 230 is for determining whether a site has expired, and should be deleted from the TBV site list. In one embodiment, a site is deleted from the TBV site list when TBV site is visited by the user. Alternatively, the site may be deleted from the TBV site list after a certain period of time has elapsed. In one embodiment, the user may select, via the interface 260, the type of deletion policy preferred.

An address recognition unit 240 is further included in the TBV unit 210. The address recognition unit 240 recognizes a resource locator (RL) in an electronic message, and adds the RL to the TBV site list. The resource locator (RL) may be any address which designates a location on the Internet. For example, the RL may be a uniform resource locator (URL), or any other designation which permits access of a location on the Internet. These electronic messages may include electronic mail (e-mail) messages, electronically received facsimile messages, and similar electronic messages. In one embodiment, the user can select the option of automatically adding all RLs to the TBV list. Alternatively, the user can select an optional add function. In that case, when the address recognition unit 240 recognizes an RL, a menu is automatically displayed. This menu permits the user to select whether the site should be added to the TBV sites. In one embodiment, the menu further permits the user to change the title/RL of the TBV site to be added to the TBV site list. This process is described in more detail below, with respect to FIG. 3.

A linking unit 250 is coupled to the address recognition unit 240. The linking unit 250 links the electronic message containing a reference to the RL to the TBV site in the web enabled application. For example, when a user receives an e-mail message which contains an RL, the linking unit 250 links the e-mail message with the TBV site which is placed in the web enabled application. Similarly, other types of electronic messages may be linked to the TBV site. Thus, when the TBV site list is examined, an icon indicates that there is a linked message. In one embodiment, the user can select the icon, and the linked message is displayed. Thus, a context is provided for the RLs within the TBV site list. In one embodiment, the linking unit 250 further maintains the link to the electronic message even if the electronic message is moved. In one embodiment, this is accomplished by storing the address at which the electronic message is stored in memory with the TBV site. Alternatively, the linking unit 250 maintains a copy of the original electronic message separate from the original message.

For one embodiment, the TBV unit 210 further includes an interface 260. The interface 260 provides a user interface for the TBV unit 210, as well as an interface with the web enabled application. The interface 260, in one embodiment, provides the menus for adding the TBV site to the web enabled application. For illustrative figures including the menus, please see FIGS. 5–8. However, it is to be understood that alternative methods of displaying the menus may be utilized. In one embodiment, the interface 260 interacts with the web enabled application to permit the display of a To-Be-Visited menu item.

Figure 3:
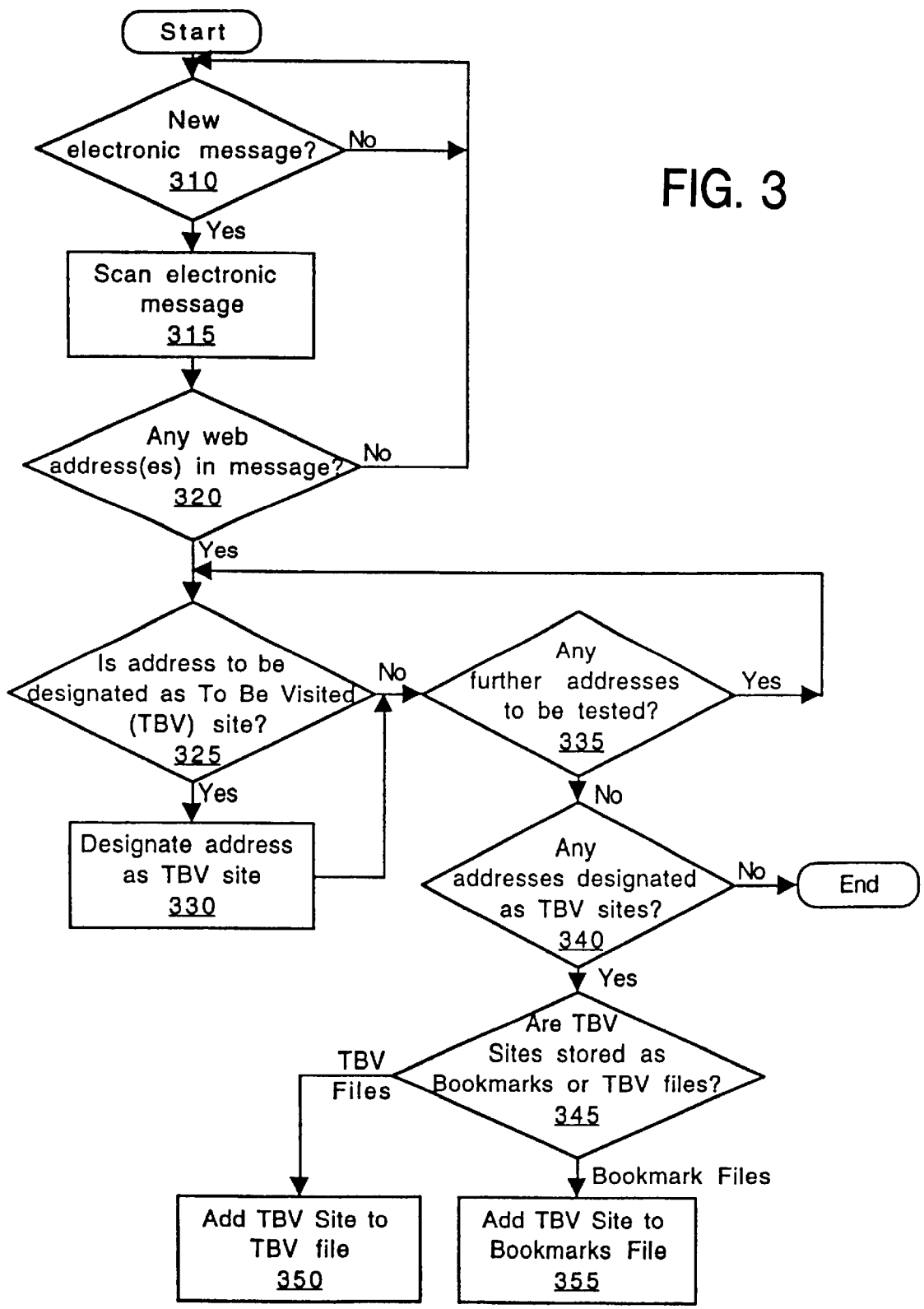
FIG. 3 is a flowchart illustrating one embodiment of a method of adding a To-Be-Visited site address to a web enabled application accessible list in accordance with the present invention.

FIG. 3 is a flowchart illustrating one embodiment of a method of adding a To-Be-Visited site from an electronic message to a web enabled application. A TBV site includes at least an RL. At block 310, the process tests whether there is a new electronic message. In one embodiment, these electronic messages may include electronic mail (e-mail) messages, electronically received facsimile messages, and similar electronic messages. If no message is received, the process returns to block 310. If a new message is detected at block 310, the process continues to block 315. Note that this may be an interrupt driven process, even though the process is illustrated as a loop.

At block 315, the electronic message is scanned. Each word in the message is compared to a database of known RL terms. These terms may include: http, //, www, .com, .edu, .gov, .net, etc. When such a term is detected, the address recognition unit 240 notes that there is an RL in the message. In one embodiment, when the RL is a URL, and the URL is not complete, the address recognition unit 240 completes the URL. Thus, for example, the URL www.sun.com is completed to be http://www.sun.com. In one embodiment, if an incomplete URL which has no extension is received, the RL is completed by adding a ".com" to the URL.

At block 320, the process tests whether any RLs were detected within the electronic message. If no RLs were detected, the process returns to block 310. If an RL was detected, the process continues to block 325.

At block 325, it is determined whether the detected RL are to be designated as TBV sites. In one embodiment, this comprises displaying a menu with the RL to the user, and permitting the user to select whether the RL should be designated as a TBV site. In an alternative embodiment, all detected RLs are automatically designated as TBV sites. In one embodiment, the user can set a preference as to which method to use in designating TBV sites.

If an RL is recognized to be a TBV site, the process continues to block 330, where the RL is designated as a TBV site. The process then returns to block 335. If the RL is determined not to be a TBV site, the process continues directly to block 335.

At block 335, the process queries whether there are any further RLs to be tested. Each RL is tested according to this process. Thus, if there are further RLs, the process returns to block 325. If there are no further RLs, the process continues to block 340.

At block 340, it is determined whether any RLs have been designated as TBV sites at block 330. If there are no RLs designated as TBV sites, the process ends. If there are some RLs designated as TBV sites, the process continues to block 345.

At block 345, the process determines how the TBV sites are stored. In one embodiment, the TBV files may either be stored in the Bookmark file, or in a TBV file. Generally the Bookmark file and TBV file are stored as text files and are accessible by the TBV unit 210.

If the TBV sites are stored as Bookmark files, the process continues to block 355. At block 355, the designated TBV sites are added to the Bookmark files. In one embodiment, this is accomplished by directly accessing a Bookmark file associated with a web enabled application. In an alternate embodiment, the web enabled application is opened, and a menu is utilized to add the TBV sites to the Bookmark file.

If the TBV sites are stored in a TBV file, the process continues to block 350. At block 350, the designated TBV sites are added to the TBV file. This may be done by accessing the TBV file directly, or by utilizing the web enabled application menus to add the sites.

Figure 4:
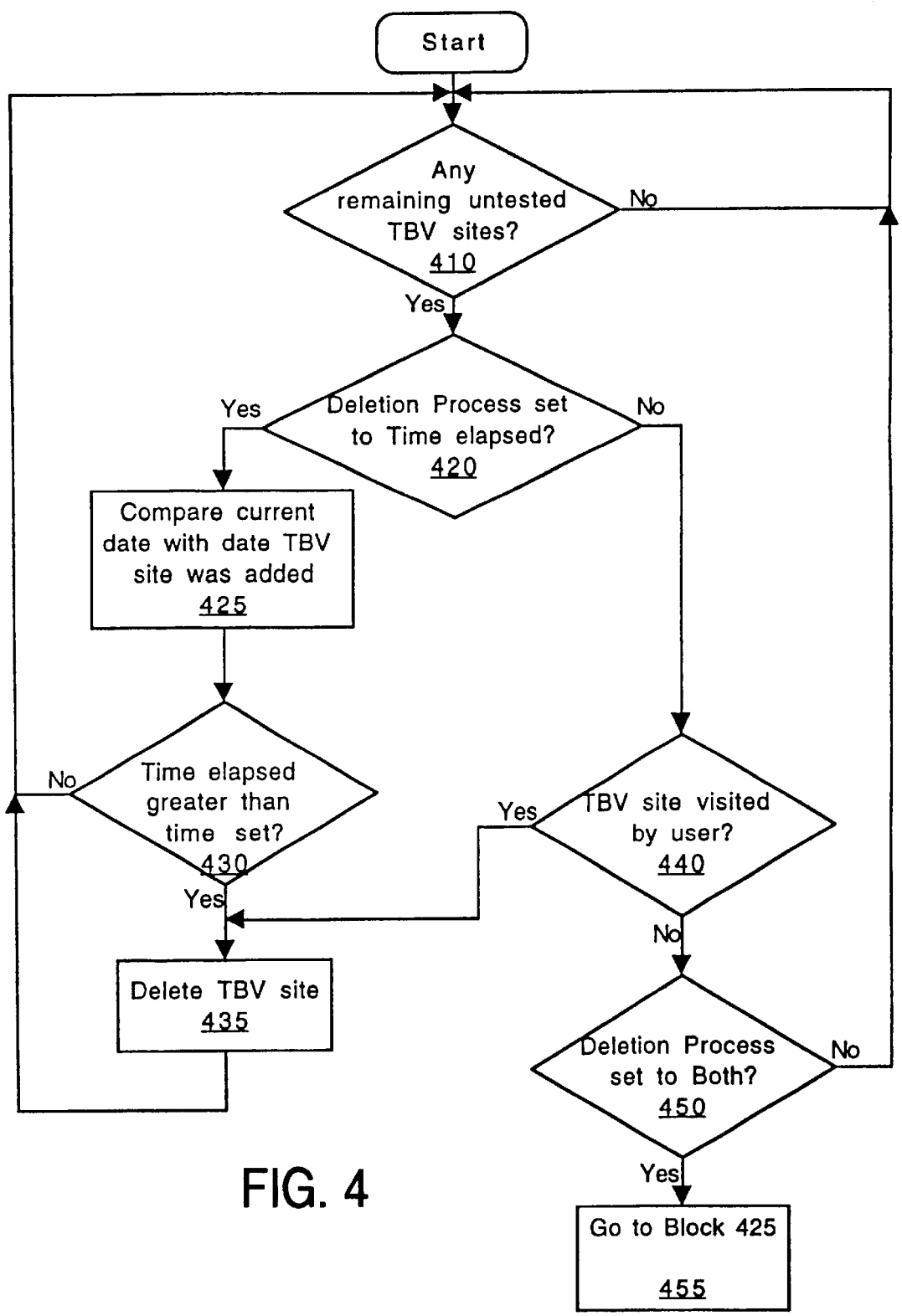
FIG. 4 is a flowchart illustrating one embodiment of a method of deleting a To-Be-Visited site from the web enabled application accessible list in accordance with the present invention.

FIG. 4 is a flowchart illustrating one embodiment of a method of determining whether a To-Be-Visited site is to be deleted from the TBV files list. The TBV files list is continually tested to determine whether any of the RLs are to be deleted from the TBV files list. In one embodiment this process is initiated every time a user starts a web enabled application. Alternatively, this process may be initiated on a regular basis, such as once a day.

At block 410, the process queries whether there are any untested TBV sites. If there are no untested TBV sites, the process terminates. If there are untested TBV sites, the process continues to block 420.

At block 420, the process tests whether the deletion policy is set to "time elapsed". In one embodiment, the deletion policy is set by user preferences. In one embodiment, the deletion policy may be set to automatically delete sites after a certain number of days has elapsed from the date that the site was added to the TBV site list. In another embodiment, the deletion policy may be set to delete only after a user has visited a site. In yet another alternate embodiment, the deletion policy may be set to delete either when the time has elapsed or when the user has visited the site. It is to be understood that other prompts for erasing TBV sites may be added to this list, and utilized. If the deletion policy is set to time elapsed, the process continues to block 415.

At block 425, the current date is compared to the date on which the TBV site was added. This conventional date comparison technique is known in the art.

At block 430, the process determines whether the time elapsed is greater than the retention time. If the elapsed time is greater than the retention time, the process continues to block 435. If the elapsed time is less than the retention time, the process returns to block 410.

At block 435, the TBV site is deleted, since the elapsed time was greater than the retention time. The process then returns to block 410.

If at block 420, it was determined that the deletion policy was not set to time elapsed, the process continues to block 440.

At block 440, the process tests whether the TBV site was visited by the user. In one embodiment this information is stored with the rest of the information about the TBV site, as will be described below. In one embodiment, this information is a simple binary toggle, which is set to indicate whether or not a user has visited the TBV site. If the user has visited the TBV site, the process continues to block 435, where the TBV site is deleted. If the user has not visited the TBV site, the process continues to block 450.

At block 450, it is tested whether the deletion policy is set to both, time elapsed time and visited site. If the deletion policy is set to both, the process continues to block 455, and the process returns to block 425. If the deletion policy is not set to both elapsed time and visited site, the returns to block 410.

FIG. 5 is a block diagram illustrating one embodiment of the contents of the information stored with respect to each TBV site. As an example, the following message is utilized:

TABLE 1

| To: | Mike Albers |
|---|---|
| From: | Joe Smith |
| Subject: | New Java Developer's Site! |
| Date: | July 4, 1997 |

Mike,
look at the cool new site that Sun has at www.sun.java.com.
-Joe

Block 510 stores the site title. In Bookmark files, generally a title is associated with an RL. Thus, for example, the RL http://www.sun.com has the title of Sun Microcomputers. For another example, the RL http://www.m-w.com has the title of Mirriam Webster Dictionary/Reference page. This page is determined by the owner of the page, and may be changed by a user. However, if a site is added to the To-Be-Visited list without accessing the page its title may not be known. Thus, a title associated with a site may be set from one of a number of sources. In one embodiment, the Subject of the e-mail or "New Java Developer's Site!" would be the title associated with the site. Alternatively, the title may be just the RL, http://www.sun.java.com. In another alternative, the title may be derived from the originator of the message, such as "Recommended by Joe Smith", or similar format. Alternatively, the system can access the site automatically without informing the user, determine the title, and add the title to the TBV site. In yet another alternative, the user is prompted to enter a title.

Block 520 stores the RL of the site. In one embodiment, the RL is stored in hypertext markup language (HTML). The RL in the example above is http://www.sun.java.com. Recall that after the address recognition unit 240 extracts the RL, the RL is completed. In this instance, the "http://" is added to the beginning of the sent RL. In one embodiment, the user is prompted to approve or change the completed RL.

Block 530 stores the date on which the site was added. This is necessary for calculations with respect to the deletion policy. This information may further be available to the user. In the above example, the date Jul. 4, 1997 would be stored.

Block 540 stores the information whether a site was visited or not visited. In one embodiment this is a simple ON/OFF toggle which is set OFF when the site is added. When the user selects the site from the To-Be-Visited Sites List, and the site is accessed, the toggle is reset to ON.

Block 550 stores an identifier for the electronic message from which the RL was received. If the site did not originate from an electronic message, block 550 may be zeroes. The information of each TBV site is linked to the originating message. Thus, for example, if a first user sent the message described above, a reference to the message location is placed in block 550. When the message is moved from the in-box, to be filed, block 550 is altered to track the message. Thus, no matter where the message is moved to, the user will be able to access the originating message. In one embodiment, when the message is deleted a copy of the message is saved in the TBV unit 210, so the user can reference the message even after deletion. Alternatively, a copy of the message may be made and the identifier may store the location of the copied message.

Block 560 stores an icon for linked messages, indicating the message type. For example, if the originating message from which the TBV site is an e-mail message, as in the example above, an envelope form may be displayed. Similar icons may be utilized to indicate other originating messages, such as faxes, etc.

Figure 6:
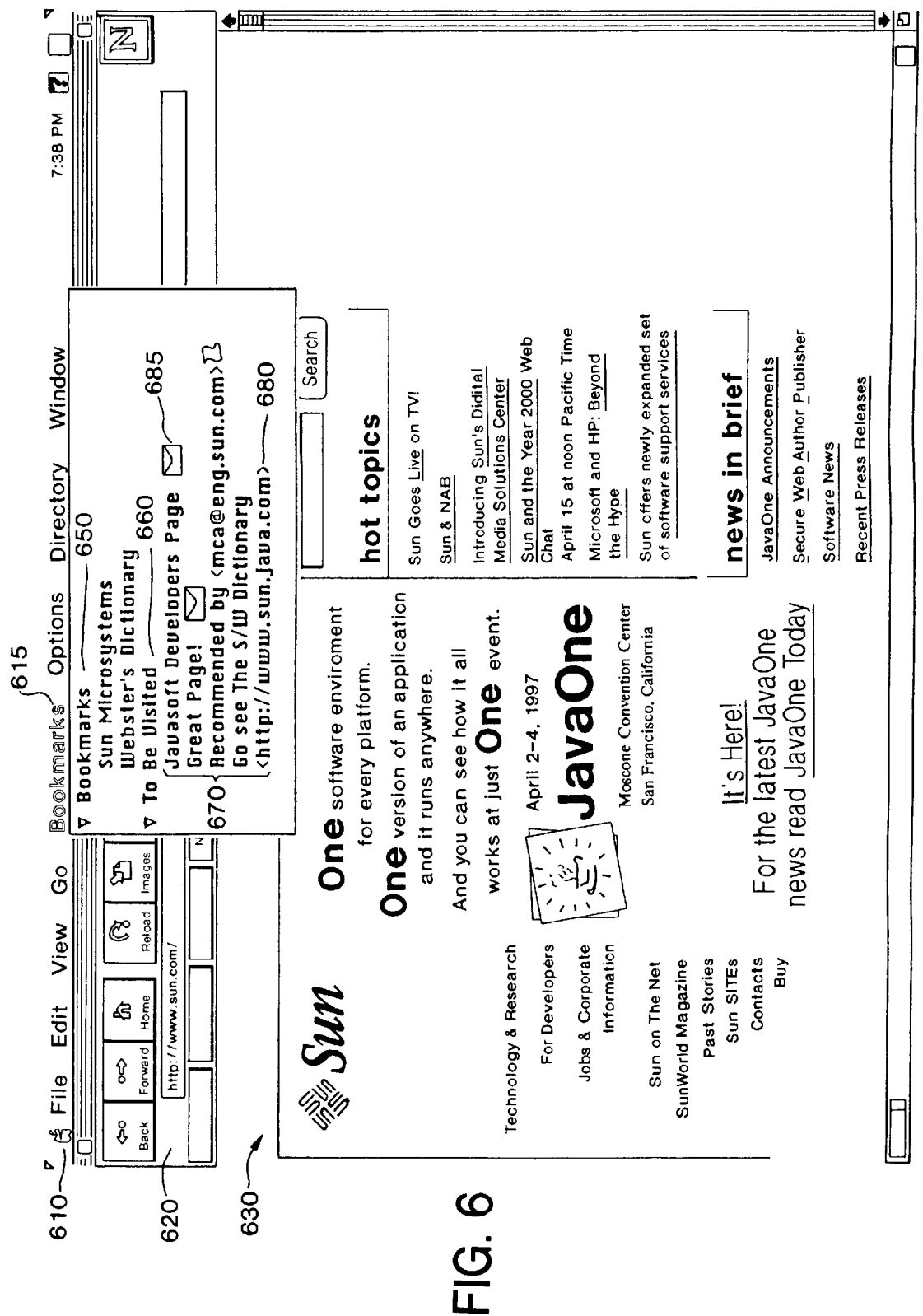
FIG. 6 is an illustration of a web browser including a bookmark file having a To-Be-Visited file.

FIG. 6 is an illustration of one embodiment of a browser including a Bookmark menu item 615 which includes a To-Be-Visited folder 660. The browser includes a menu list 610, an RL display area 620, and a site display area 630. The menu list 610 includes Bookmark menu item 615. The Bookmark menu item 615 is open in this illustration. The Bookmark menu item 615 includes a plurality of folders 650. One of these folders is the To-Be-Visited Folder 660. The To-Be-Visited Folder 660 is similar to all the other folders, but contains To-Be-Visited files 670. Each To-Be-Visited file 670 is displayed by its title 680, and by a linked icon 685. Note that the titles 680 may vary from a user entered title, to a title derived from the sender or subject of the originating message, or the RL.

Figure 7:
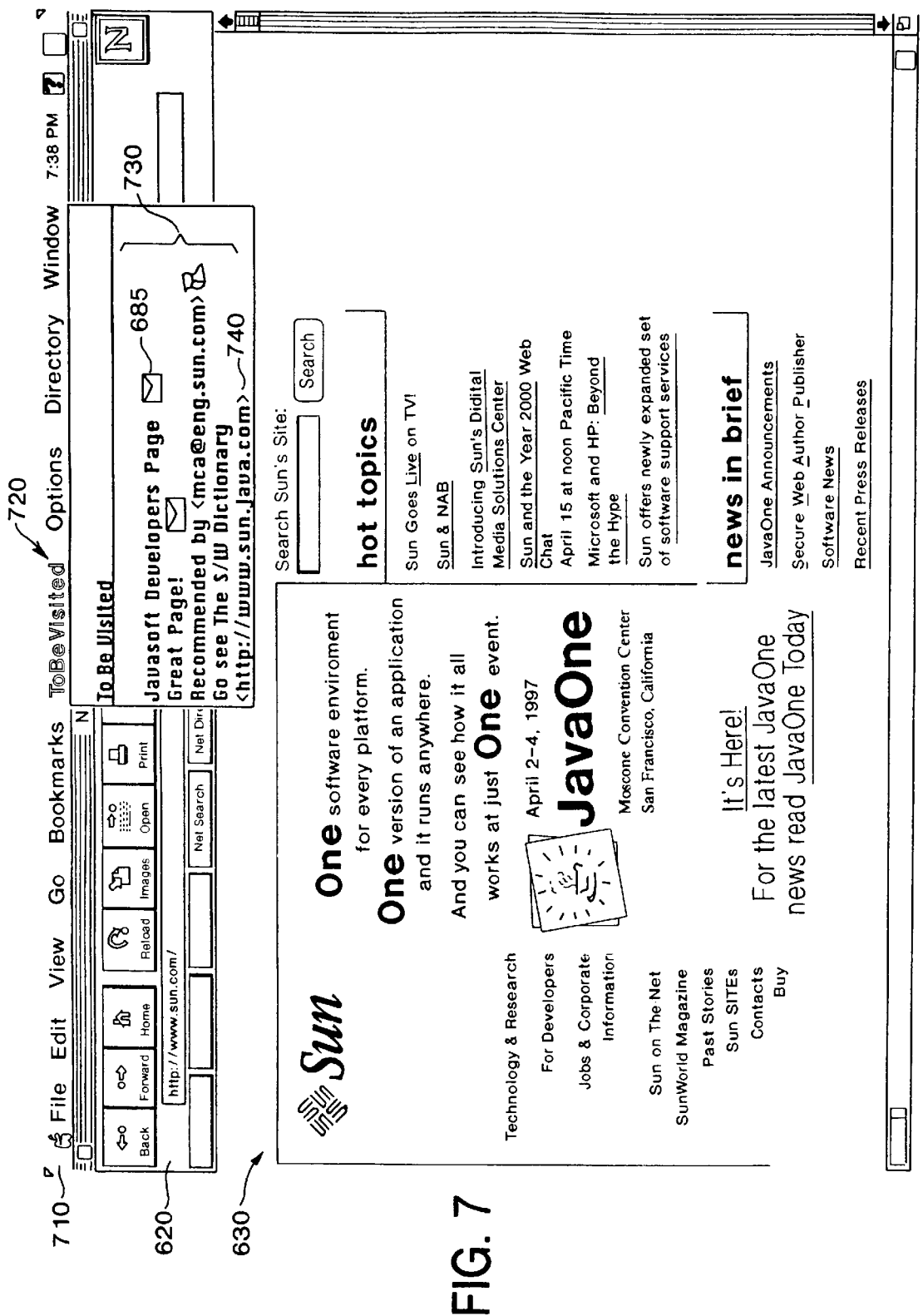
FIG. 7 is an illustration of a web browser including a To-Be-Visited Menu item.

FIG. 7 is an illustration of one embodiment of a browser including a To-Be-Visited Menu item 720. The browser includes an RL display area 620, and site display area 630. The browser also includes a menu list 710, including a To-Be-Visited menu item 720. In this illustration, the To-Be-Visited menu item 720 is open, and displays the To-Be-Visited list 730. The To-Be-Visited list 730 includes a number of titles 740. Each of these titles 740 correspond to a site in the To-Be-Visited list 730. Some of the titles 740 also have a corresponding icon 750, which represents a linked message. Note the variety of titles, which are merely illustrative.

Figure 8:
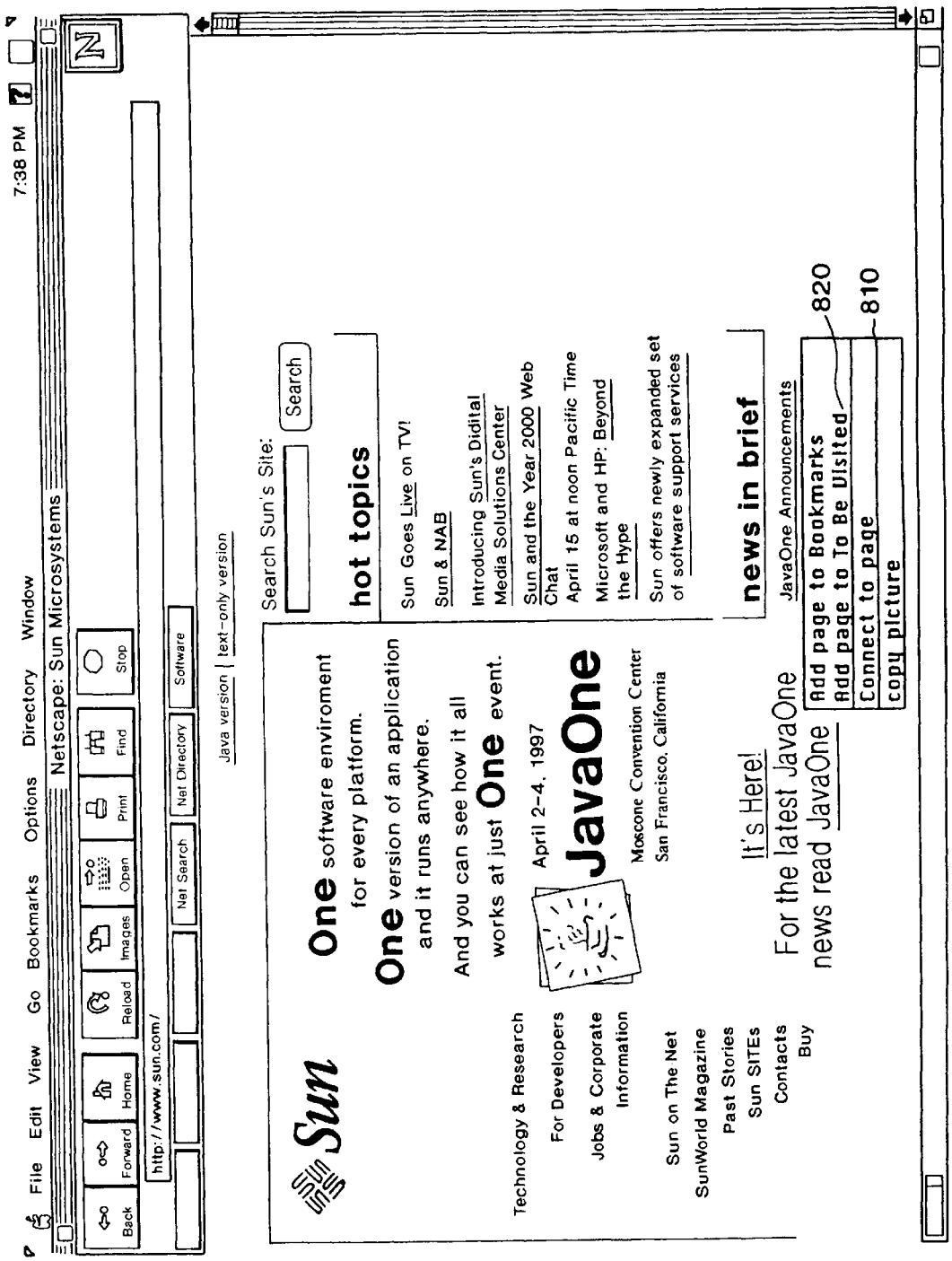
FIG. 8 is an illustration of a web browser including a pop-up menu having a To-Be-Visited menu item.

FIG. 8 is an illustration of one embodiment of a browser including a pop-up menu 810. In a browser, when a user highlights an RL, pop-up menu 810 may appear. This is one illustration of the pop-up menu 810. The pop-up menu 810 may include an item indicating that the highlighted RL should be opened. The pop-up menu 810 also includes an item entitled "Add to To-Be-Visited" 820. This permits the addition of the site, to the To-Be-Visited list. However, this process does not open the RL.

It is to be understood that although the term resource locator (RL) is used in the specification, alternate methods of specifying an object on the Internet may be utilized without changing the spirit of the present invention. Additionally, within an RL type, alternative access schemes or protocols may be utilized. Thus an RL corresponding to file transfer protocol (ftp), telnet, etc. may be utilized.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. The present invention should not be construed as limited by such embodiments and examples, but rather construed according to the following claims and their equivalents.

What is claimed is:

1. An apparatus comprising:
   an access unit for permitting a user to add a To-Be-Visited (TBV) site address or resource locator (RL) to a web enabled application accessible list without said user visiting said TBV site; and
   a dating/deleting unit for adding a date to said TBV site, and for periodically determining based on said date whether said TBV site is expired, and deleting said TBV site if said TBV site is expired;
   determining if said user has visited said TBV site; and
   in response to said user visiting said TBV site, permanently deleting said TBV site from said list, such that only sites that have not yet been visited by said user are on said TBV list.

2. The apparatus of claim 1 further including a To-Be-Visited bookmark file for filing said TBV site.

3. The apparatus of claim 1 further including a To-Be-Visited menu item for filing said TBV site.

4. The apparatus of claim 1 further including an address recognition unit for recognizing a resource locator (RL), and for designating said RL as said TBV site, and passing said TBV site to said access unit.

5. The apparatus of claim 4, wherein said address recognition unit further includes an electronic message recognition unit for recognizing said RL in an electronic message.

6. The apparatus of claim 5, wherein said address recognition unit further includes a scanning unit for scanning electronic message and for automatically identifying text representing said RL.

7. The apparatus of claim 5 further including a linking unit, said linking unit linking said electronic message containing a reference to said RL to said TBV site in said web enabled application accessible list.

8. The apparatus of claim 7, wherein said linking unit maintains a link between said electronic message containing said reference to said RL and said TBV site in said web enabled application accessible list even if said electronic message is moved or filed.

9. The apparatus of claim 1 further including a pop-up menu, said pop-up menu for selecting a resource locator (RL) displayed in a web enabled application and designating said RL as said TBV site.

10. The apparatus of claim 1 wherein said TBV site expires when a user has visited a resource locator (RL) designated by said TBV site.

11. The apparatus of claim 1 wherein said TBV site expires when a time period has elapsed from a date on which said TBV site was added.

12. The apparatus of claim 11 wherein a user may select a time at which said TBV site expires, by selecting said time period elapsed from said date on which said TBV site was added, or by selecting that said TBV site should expire when said user has visited said TBV site.

13. The apparatus of claim 1, wherein the TBV list is continually tested to determine whether any of the RLs are to be deleted from the TBV list.

14. The apparatus of claim 1, wherein the date/deleting unit verifies TBV file every time a user starts the web enabled application to determine if any of the RLs are to be deleted from the TBV list.

15. The apparatus of claim 1, wherein the date/deleting unit verifies the TBV file on a regular basis, e.g. once per day to determine if any of the RLs are to be deleted from the TBV list.

16. An apparatus comprising:
an access unit for adding a To-Be Visited (TBV) site address or resource locator (RL) to a list, said list accessible to a plurality of web enabled applications;
a dating/deleting unit for adding a date to said TBV site, said dating/deleting unit periodically determining whether the TBV site is to be deleted, said dating/deleting unit to expire said TBV site from said list when a certain number of days have passed; and
said dating/deleting unit further for determining if a user has visited said TBV site, and permanently deleting said TBV site when a user has visited said TBV site, such that only sites that have not yet been visited by said user are on said TBV list.

17. An apparatus comprising:
an address recognition unit for recognizing a resource locator (RL) in an electronic message, and for designating said RL as a TBV site, and passing said TBV site to an access unit;
said access unit for adding a To-Be-Visited (TBV) site to a web enabled application accessible list; and
a dating/deleting unit for periodically determining whether a user has visited said TBV site and permanently deleting said TBV site from said web enabled application accessible list when a user has accessed said TBV site, such that only sites that have not yet been visited by said user are on said TBV list.

18. A method comprising the said computer implemented steps of:
receiving a To-Be-Visited (TBV) site address or resource locator (RL);
filing said TBV site in a web enabled application accessible list, thus making said TBV site available to a user utilizing said web enabled application accessible list;

adding a date to said TBV;
periodically determining if said TBV site has expired based on said date;
determining if a user has visited said TBV site, wherein said TBV site expires when a user visits a resource locator (RL) designated by said TBV site; and
if said TBV site has expired, permanently deleting said TBV site from said web enabled application accessible list, such that only sites that have not yet been visited by said user, and that are more recent than an expiration period are on TBV list.

19. The method of claim 18 wherein said TBV site is filed under a To-Be-Visited File in a bookmark file of said web enabled application accessible list.

20. The method of claim 18, wherein said TBV site is filed under a To-Be-Visited menu item.

21. The method of claim 18, wherein receiving a TBV site comprise
scanning an electronic message to determine whether said electronic message contains a resource locator (RL) representing a TBV site; and
recognizing said RL contained in said electronic message.

22. The method of claim 18, further comprising linking said electronic message containing said RL to said TBV filed in said web enabled application accessible list.

23. The method of claim 18, wherein determining if said TBV site has expired comprises determining if said user has visited an address associated with said TBV site and marking said TBV site expired if said user has visited said address.

24. A computer data signal embodied in a carrier wave and representing sequences of instructions which, when executed by a processor, cause said processor to include a To-Be-Visited (TBV) site in a web enabled application by receiving a TBV site address or resource locator (RL);
adding a date to said TBV site and filing said TBV site in said web enabled application accessible list, thus making said TBV site available to a user utilizing said web enabled application accessible list;
determining periodically if said TBV site has expired based on said date, and if said TBV site has expired, deleting said TBV site from said web enabled application accessible list;
determining if said user has visited said TBV site; and
in response to said user visiting said TBV site, permanently deleting said TBV site from the said list, such that only sites that have not yet been visited by said user are on said TBV list.

25. The computer data signal of claim 24 further comprising:
scanning an electronic message to determine whether said electronic message contains a resource locator (RL) representing a TBV site;
recognizing said RL contained in said electronic message; and
linking said electronic message containing said RL to said TBV filed in said web enabled application accessible list.

26. A machine readable medium having stored thereon data representing sequences of instructions which when executed by a computer system, cause said computer system to perform the steps of:

receiving a TBV site address or resource locator (RL);

filing said TBV site in a web enabled application accessible list, thus making said TBV site available to a user utilizing said web enabled application accessible list; and determining if said TBV site has expired because said user has visited said TBV site, and if said TBV site has expired, permanently deleting said TBV site from said web enabled application accessible list, such that only sites that have not yet been visited by said user are on said TBV list.

27. The machine readable medium of claim 23, said data representing sequences of instructions, which when executed by said computer system further cause said computer system to perform said steps of:

scanning an electronic message to determine whether said electronic message contains a resource locator (RL) representing a TBV site;

recognizing said RL contained in said electronic message; and linking said electronic message containing said RL to said TBV filed in said web enabled application accessible list.

\* \* \* \* \*